United States Patent [19]

Aufderhaar et al.

[11] 4,446,021

[45] May 1, 1984

[54] FILTER-MEDIUM SUPPORT PLATE FOR CENTRIFUGAL FILTER

[75] Inventors: Erhard Aufderhaar, Unterschleissheim; Johannes Feller, Munich; Günther Hultsch, Oberschleissheim; Walter Kisslinger, Munich, all of Fed. Rep. of Germany

[73] Assignee: Krauss-Maffei Aktiengesellschaft, Munich, Fed. Rep. of Germany

[21] Appl. No.: 405,089

[22] Filed: Aug. 4, 1982

[30] Foreign Application Priority Data

Aug. 25, 1981 [DE] Fed. Rep. of Germany ....... 3133474

[51] Int. Cl.[3] ................................................ B01D 33/02

[52] U.S. Cl. ................................ 210/378; 210/380.1

[58] Field of Search ..................... 210/360.1, 369, 378, 210/380.1, 380.3, 381, 486, 487

[56] References Cited

U.S. PATENT DOCUMENTS

| | | | |
|---|---|---|---|
| 1,557,585 | 10/1925 | Hele-Shaw | 210/380.1 |
| 2,720,982 | 10/1955 | Stuart | 210/380.1 |
| 3,385,443 | 5/1968 | Cuza | 210/369 |
| 3,630,379 | 12/1971 | Sharples | 210/380.1 |
| 3,794,178 | 2/1974 | Luthi | 210/400 |
| 3,917,534 | 11/1975 | Moore | 210/486 |

FOREIGN PATENT DOCUMENTS

| | | |
|---|---|---|
| 450220 | 7/1963 | Fed. Rep. of Germany . |
| 580986 | 10/1976 | Switzerland . |

*Primary Examiner*—John Adee

*Attorney, Agent, or Firm*—Karl F. Ross; Herbert Dubno

[57] ABSTRACT

A centrifugal filter has a centrifuge drum rotatable about an axis and provided with a plurality of sieve support plates lining the drum. Each of the plates is generally flat and rectangular and has a radially inwardly directed inner face. They are each formed with an array of flow grooves extending on and opening radially inwardly at the inner face and each having an outer end and an inner end spaced along the plate therefrom. The flow grooves are of increasing flow cross section from their outer ends to their inner ends. An outlet serves for draining liquid from the inner ends. A filter medium overlies the inner face over the flow grooves. Thus flow is maintained substantially uniform even at the outer groove ends, where relatively little filtrate moves. As a result clogging of these flow grooves is impossible; they will stay clear along their entire lengths.

15 Claims, 6 Drawing Figures

FILTER-MEDIUM SUPPORT PLATE FOR CENTRIFUGAL FILTER

FIELD OF THE INVENTION

The present invention relates to a filter-medium support plate for a centrifugal filter. More particularly this invention concerns such a plate which facilitates the draining of the liquid phase or filtrate in a liquid-solid filter system.

BACKGROUND OF THE INVENTION

In commonly owned U.S. Pat. Nos. 3,943,056 and 4,052,303 a centrifugal filter is described which basically comprises a rotary basket or drum which is centered on an axis and which is normally rotated at high speed about this axis. The drum is provided with a filter medium and forms an output chamber radially outside the filter and an input chamber radially inside it.

Material to be filtered, normally a liquid/solids suspension, is fed into the drum as it rotates. The solids are trapped against the filter medium to form a filter cake, and the liquid phase passes through this cake and the medium to the output chamber. To increase efficiency it is known to form the output chamber in two compartments, one radially outside or underneath the filter medium and one axially offset therefrom but communicating therewith via an appropriate passage. The two compartments are maintained full of the liquids to a radial depth reaching radially inward to the filter cake so a liquid continuum is formed that extends radially inward at least to the filter cake. A dip or siphon tube controls the liquid depth—measured radially in this type of system—in the outer compartment to control the pressure across the cake and thereby regulate the system throughput.

The drum normally has an outer imperforate wall and, spaced radially inward therefrom, an inner perforated wall that extends perfectly cylindrically and that in turn supports a mesh, which may be a textile, a perforated metal plate, or a metallic screen of fine or coarse mesh size. The filter cake in turn lies on this mesh. Obviously clogging is a problem with this type of filter, in particular when it is operated continuously for long runs.

In other systems the filter element is constituted and/or supported by axially extending rods between which the liquid can flow, with the rods forming a cylindrical or slightly frustoconical support surface. Such an arrangement is less prone to clogging and is inexpensive to manufacture. It is particularly likely to clog at the regions of reduced filtrate flow, normally at the ends of the filter passages remote from the end the filtrate is drawn off.

OBJECTS OF THE INVENTION

It is therefore an object of the present invention to provide an improved centrifugal filter.

Another object is the provision of such a centrifugal filter which overcomes the above-given disadvantages.

A further object is to provide an improved sieve support for such a filter.

SUMMARY OF THE INVENTION

These objects are attained according to the instant invention in a centrifugal filter having a centrifuge drum rotatable about an axis and provided with a plurality of sieve support plates lining the drum. Each of the plates is generally flat and rectangular and has a radially inwardly directed inner face. They are each formed with an array of flow grooves extending on and opening radially inward at the inner face and each having an outer end and an inner end spaced along the plate therefrom. The flow grooves are of increasing flow cross section from their outer ends to their inner ends. Means is provided for draining liquid from the inner ends. A filter medium overlies the inner face over the flow grooves.

With such a construction flow is maintained substantially uniform even at the outer groove ends, where relatively little filtrate moves. As a result clogging of these flow grooves is impossible; they will stay clear along their entire lengths.

According to this invention the flow grooves are generally evenly distributed over the inner face and are each of increasing depth perpendicular thereto from their outer to their inner ends. Thus as the amount of filtrate flowing in the groove increases, so does its flow cross section, with the result that the flow rate is the same along the entire length of each flow groove. In addition by varying the groove depth it is possible to use sieve support plates of uniform thickness so that a cylindrical support surface is formed for the filter medium. In addition when the flow cross section is increased by increasing flow-groove depth, the between-groove ridges or lands can be of the same width measured angularly for good support of the filter medium.

According to another feature of this invention the plate is also formed with a collection groove into which the inner ends of the flow grooves open and an outlet opening into which the collection groove opens. The collection groove and opening constitute the means. More particularly the flow grooves are generally parallel and transverse to the connection groove and the plate is formed between the flow grooves with ribs supporting the medium. In this case these ribs are rectangular to provide a solid support for the mesh or the like forming the filter medium. According to the invention the flow grooves are arranged in two rows flanking the connection groove.

In accordance with another feature of this invention the collection groove is formed as two parallel respective subgrooves into which the rows empty and which themselves empty into the outlet opening. These two grooves can be bridged by the above-mentioned ribs so that the filter medium is supported at them.

For ease of mounting in the centrifuge drum, the plate is limitedly elastically deformable and is provided centrally with an axially extending weight of greater density than the plate. Thus as the drum spins the plates are urged centrifugally into tight contact with the inner drum surface. This elastic deformability is created by making the plate of an elastically deformable synthetic resin and forming its outer face opposite the inner face with generally axial flex grooves open radially outward.

In order to incorporate the inventive structure in a siphon-type centrifuge filter as described in above-cited U.S. Pat. No. 4,052,303, the plate is provided at the outlet opening with a throughgoing pipe and is provided around the pipe with a seal ring. The drum forms a radially inwardly open annular trough into which the pipe opens and is provided with a siphon tube opening into the trough.

According to another feature of this invention the medium is a mesh and the plate is formed with a periphery at the inner face to which the mesh is welded. This can be done simply by laying the mesh on the plate and running around the periphery with a hot welding tool to melt the plate through the mesh.

It is also within the scope of this invention to provide the plate with a removable insert forming the collection groove. The above-mentioned weight can then simply be mounted under this insert. As a result it is possible to produce the sieve support plate of this invention at very low cost.

DESCRIPTION OF THE DRAWING

The above and other features and advantages will become more readily apparent from the following, reference being made to the accompanying drawing in which.

SPECIFIC DESCRIPTION

Figure 1:
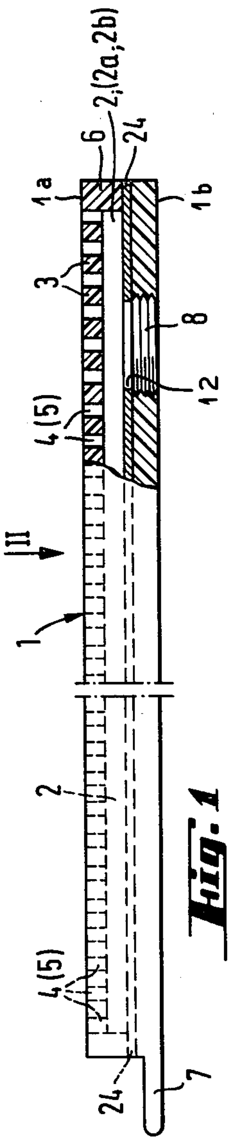
FIG. 1 is a partly sectional side view of a plate according to this invention.
Figure 2:
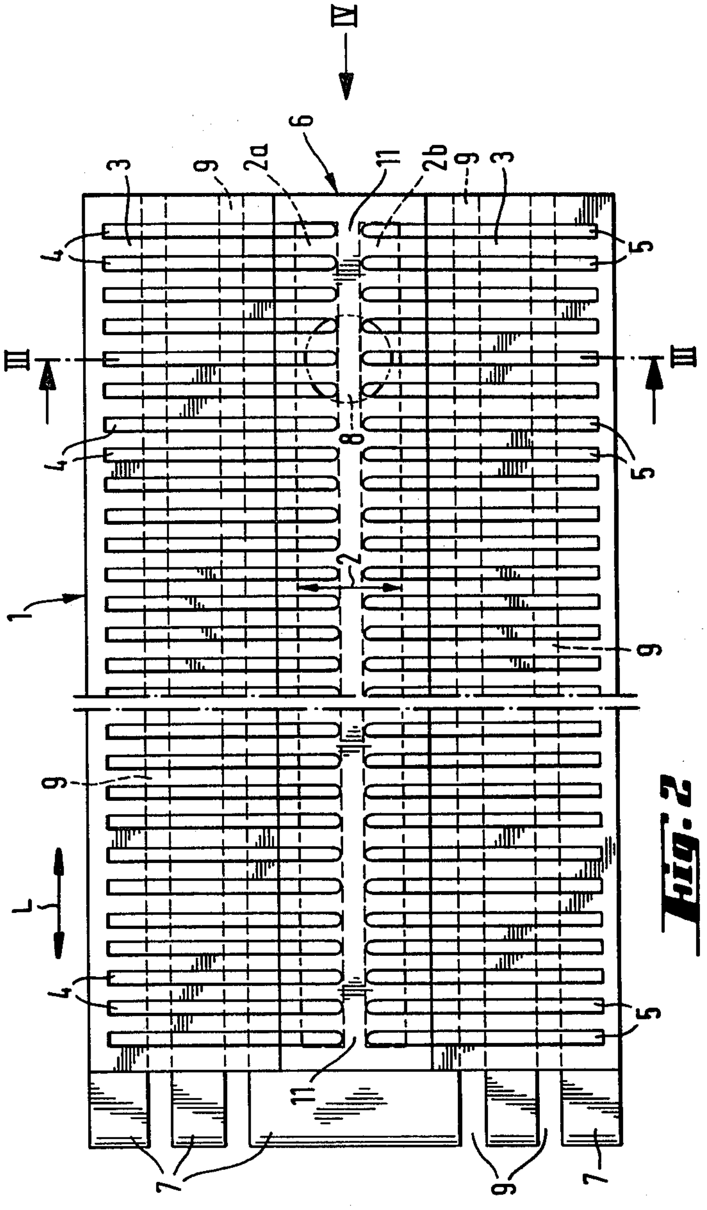
FIG. 2 is a top view of the plate taken in the direction of arrow II of FIG. 1.
Figure 3:
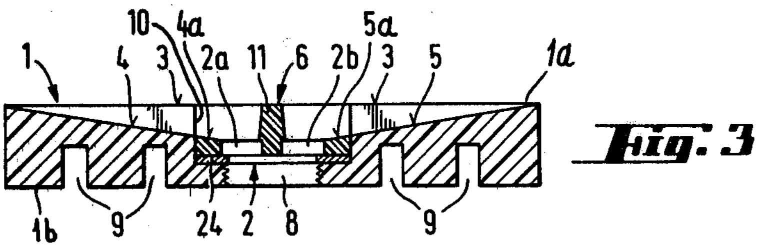
FIG. 3 is a section taken along line III—III of FIG. 2.
Figure 4:
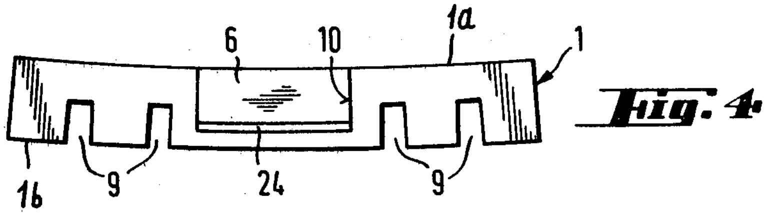
FIG. 4 is an end view taken in in direction of arrow IV of FIG. 2.

As seen in FIGS. 1–4 a sieve support plate 1 according to this invention is basically rectangular, having a long dimension in a longitudinal direction L and formed of a limitedly elastically deformable thermoplastic synthetic resin. It is formed with a central longitudinally extending collection groove 2 having two transversely spaced and parallel parts 2*a* and 2*b*. To one side of the groove 2, opening into the subgroove 2*a*, the plate 1 is formed with a plurality of tranverse flow grooves 4 and to the other side, opening into the subgroove 2*b*, with a plurality of identical transverse flow grooves 4. The grooves 4 and 5 open upward at an inner face 1*a* of the plate 1 and form identical transverse ridges 3. Between the grooves 4 on one side and the grooves 5 on the other the plate has on the face 1*a* another rib or ridge 11 itself lying between the two parts 2*a* and 2*b* of the collection groove 2.

At the one longitudinal end the plate 1 has projections 7 that fit in a groove of the drum it is to be mounted in. To allow the normally planar plate 1 to fit against a cylindrical surface it is formed on its face 1*b* with longitudinal flex grooves 9 permitting it to assume the warped position of FIG. 4, with the surfaces 1*a* and 1*b* part cylindrical.

Figure 5:
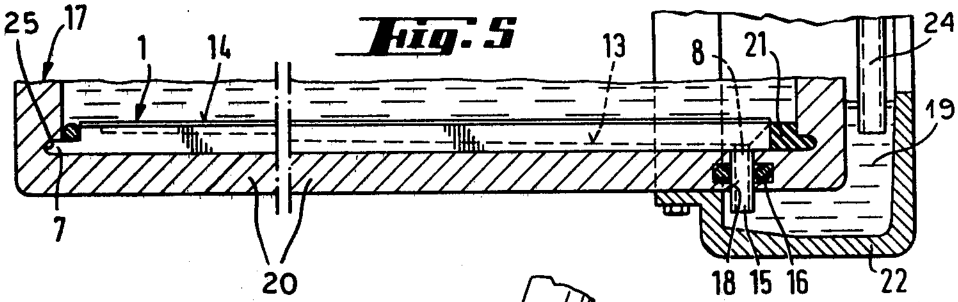
FIG. 5 is an axial section through a portion of a centrifuge drum provided with a plate according to this invention.

The grooves 4 and 5 are of increasing depth as they approach the respective subgrooves 2*a* and 2*b* so that they are of increasing flow cross section from their outer ends toward their inner ends at the groove 2. The floors 13 of the grooves 1*a* subgrooves 2*a* and 2*b* are similarly, as seen in FIG. 5, of increasing depth toward an outlet 8 fo flow through them also at a uniform speed. In addition the plate 1 is formed with a rectangular-section longitudinal groove 10 open at the face 1*a* and fitted with a complementary insert 6 that forms the rib 11 as well as the inner regions of the ribs 3 and of the grooves 4 and 5. Near the end of the groove 2 remote from the projections 7 the plate 1 is formed with a threaded drain or outlet opening 8 that bridges the two subgrooves 2*a* and 2*b*. Underneath the insert 6 the plate 1 is provided with a metallic strip 24 of some heavy metal and formed in line with the hole 8 with a corresponding hole 12. This strip 24 is of much greater density than the plate 1 so that when the plate 1 is mounted in place centrifugal force effective on this strip 24 will force it to conform to the part-cylindrical shape of FIG. 4. The plate 1 and insert 6 can both be made relatively easily by standard injection-molding techniques, using nothing more complicated than a two-part mold for each. They may be permanently assembled together by means of an appropriate adhesive.

Figure 6:
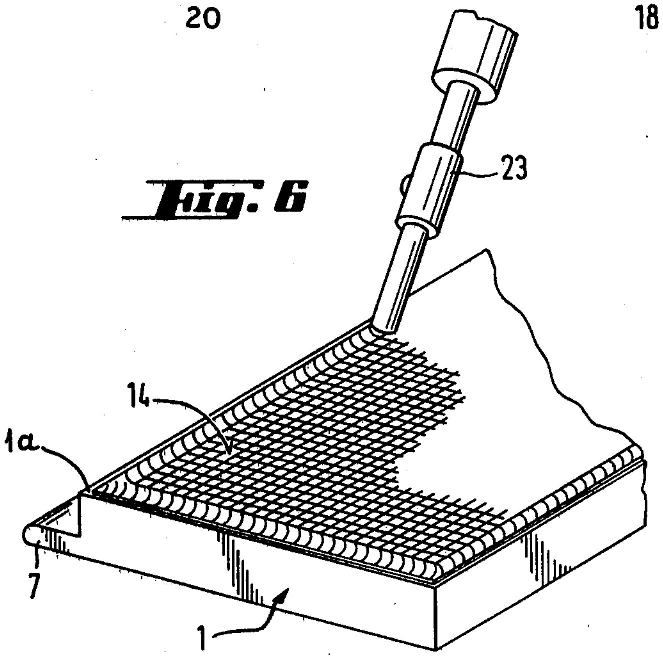
FIG. 6 is a perspective view illustrating a detail of the manufacture of the plate according to this invention.

A filter-medium mesh 14 lies on top of the ribs 3 and 11. As shown in FIG. 6 this mesh 14 is secured to the face 1*a* by welding it in place with a soldering tool 23. If the mesh 14 is made of a thermoplastic resin, it will become welded to the periphery of the face 1*a*. Even if it is metallic the tool 23 will melt the resin of the plate 1 and solidly and permanently secure the mesh 14 in place with the fused resin at the edge, even if it does not make a molecular bond.

FIG. 5 shows how the plate 1 is mounted in a centrifuge drum 17. To this end its projections 7 are fitted in a groove 25 at one end of the outer wall 20 and at the other end a rubber ring 21 holds it and all the other plates snugly in place. The wall 20 is formed in line with each outlet opening 8 with a hole 18 provided with an O-ring 16. A short piece of pipe 15 is screwed into each opening 8 and is snugly engaged by the ring 16. It opens externally into a water-filled siphon compartment 19 formed by a chamber extension 22 on the drum 17. A dip or siphon tube 24 can extend down below the liquid level in the siphon chamber 19 to establish whatever radial liquid depth is desired, with the depth in the chamber 19 being less than that inside the drum 17.

Normally the drum 17 is rotated at high speed about its axis, on which the outer drum wall 20 is centered. A suspension to be filtered is fed into the drum, and the dip tube 24 is connected to a suction pump.

The solid phase of the suspension will form a filter cake on the mesh 14, with the filtrate running through this cake and mesh and then along the grooves 4 and 5 to the drain grooves 2*a* and 2*b*. From here it flows through the pipe 15 of the outlet 8 into the compartment 19. Once this compartment 19 is filled to the proper level the system can be used for batch processing of suspensions to be filtered. If the wall 20 is frustoconical it can be used for continuous processing, with the solids migrating along the wall.

In any case the plates 1 according to the instant invention allow the entire area of the meshes 14 to be employed effectively during filtering. The plates can be mounted easily, without even using tools, in a drum and will be made by the weights 24 to conform to the drum shape. If a little space is left between adjacent plates, the result will not be inadequate filtering action, since all filtering must take place through the meshes as the only drains are formed by the pipes 15 which are connected to the drain grooves 2. Even if the area next to and under the plates 1 is filled with unfiltered suspension, it will not affect the filtering efficiency or action at all.

The plates can be produced at low cost by standard plastics technology. They need merely be of a material that will not be corroded by the chemicals being filtered, and can be made so cheaply that they are simply replaced periodically, an operation that is quite simple.

We claim:

1. In a centrifugal filter:

a centrifuge drum rotatable about an axis;

a plurality of support plates lining the drum, each of the plates being generally flat and generally rectangular and having a radially inwardly directed inner face, the plates each being formed with an array of flow grooves extending on and opening radially inwardly at the inner face and each having an upstream end and an opposite downstream end spaced along the plate from each other, the flow grooves each being of generally regularly increasing flow cross section generally parallel to the inner face from their upstream ends to their downstream ends;

means for draining liquid from the downstream ends; and a filter medium overlying the inner face over the flow grooves.

2. The combination defined in claim 1 wherein the flow grooves are generally evenly distributed over the inner face and are each of generally regularly increasing radial depth and generally constant transverse width.

3. The combination defined in claim 1 wherein the plate is further formed with:

a collection groove into which the downstream ends of the flow grooves open; and an outlet opening into which the collection groove opens, the collection groove and opening constituting the drain means.

4. The combination defined in claim 3 wherein the flow grooves are generally parallel and transverse to the collection groove and the plate is formed with:

ribs between the flow grooves supporting the medium.

5. The combination defined in claim 4 wherein the flow grooves are arranged in two rows flanking the collection groove.

6. The combination defined in claim 3 wherein the plate is limitedly elastically deformable and is provided centrally with an axially extending weight of greater density than the plate.

7. The combination defined in claim 3 wherein the plate is provided at the outlet opening with a throughgoing pipe and is provided around the pipe with a seal ring, the drum forming a radially inwardly open annular trough into which the pipe opens.

8. The combination defined in claim 7 wherein the drum is provided with a siphon tube opening into the trough.

9. The combination defined in claim 3 wherein the plate is formed of an elastically deformable synthetic resin with:

an outer face opposite the inner face and formed with generally axial flex grooves open radially outward, whereby the plate can deform to lie flatly against a cylindrical surface.

10. The combination defined in claim 3 wherein the medium is a mesh and the plate is formed with:

a periphery at the inner face, the mesh being welded to the periphery.

11. The combination defined in claim 3 wherein the plate is provided with a removable insert forming the collection groove and portions of the flow grooves.

12. The combination defined in claim 11 wherein the plate is provided under the insert with an axially extending weight of greater density than the plate.

13. The combination defined in claim 3 wherein the drum has a cylindrical inner surface and the plate is formed with:

an outer face lying flatly against the cylindrical inner surface.

14. The combination defined in claim 3 wherein the flow grooves extend generally circumferentially and the collection groove axially.

15. In a centrifugal filter:

a centrifuge drum rotatable about an axis;

a plurality of support plates lining the drum, each of the plates being generally flat and generally rectangular and having a radially inwardly directed inner face, the plates each being formed with an array of generally parallel flow grooves extending on and opening radially inwardly at the inner face and each having an upstream end and a downstream end spaced along the plate from each other, the flow grooves each being of generally regularly increasing flow cross section from their upstream ends to their downstream ends;

ribs between the flow grooves;

a collection groove into which the downstream ends of the flow grooves open and transverse to the flow grooves, the flow grooves being arranged in two rows flanking the collection groove, the collection groove being formed as two parallel respective subgrooves into which the rows empty; and an outlet opening into which the subgrooves open;

means including the collection groove and opening for draining liquid from the downstream ends; and a filter medium overlying the inner face over the flow grooves and on the ribs.

* * * * *